Dec. 26, 1967

E. J. TRYON ET AL 3,359,993

CHANGEMAKER

Filed March 4, 1966

INVENTORS.
EDWARD J. TRYON and
MELVIN D. PERDUE

BY *Woodard, Weikart, Emhardt & Naughton*

Attorneys

Dec. 26, 1967  E. J. TRYON ET AL  3,359,993
CHANGEMAKER
Filed March 4, 1966  4 Sheets-Sheet 2
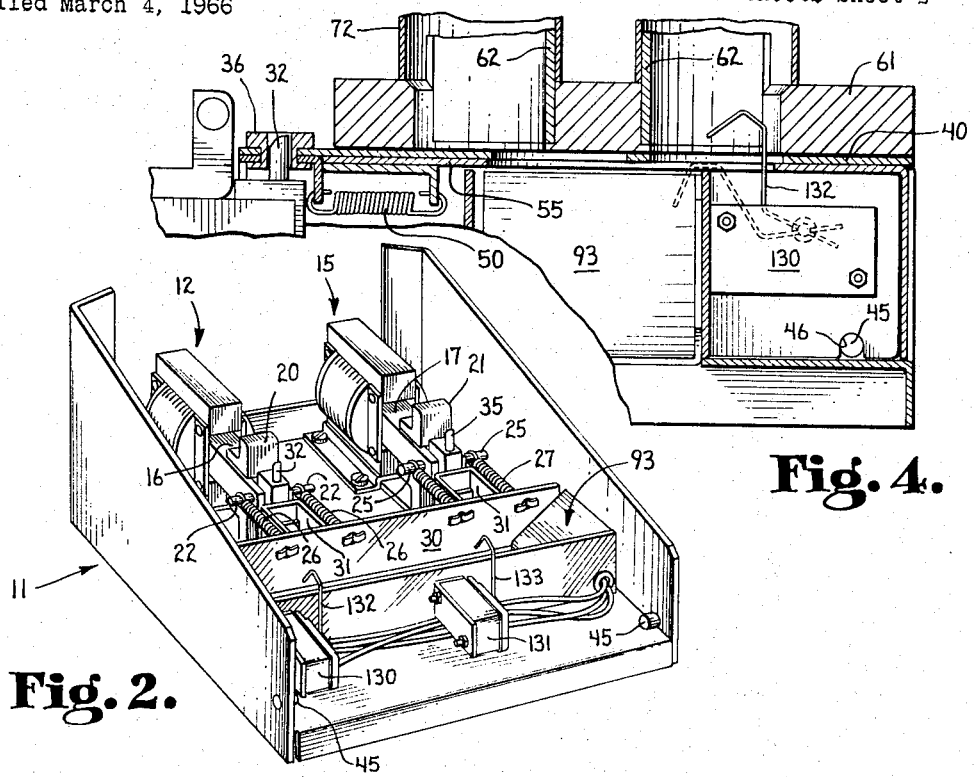
Fig. 4.
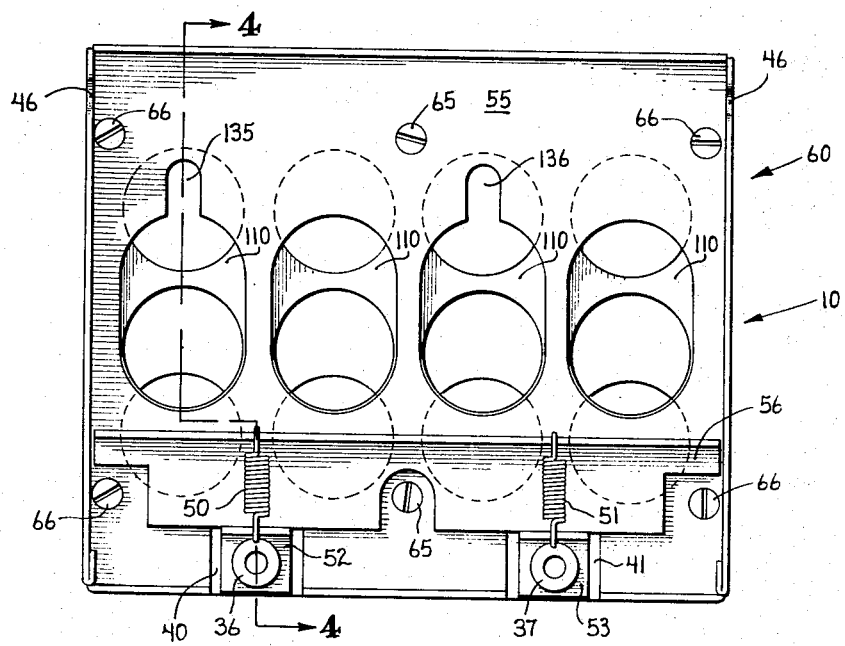
Fig. 2.
Fig. 3.
INVENTORS.
EDWARD J. TRYON and
MELVIN D. PERDUE
BY Woodard, Weikart, Emhardt & Naughton
Attorneys Dec. 26, 1967   E. J. TRYON ET AL   3,359,993
CHANGEMAKER
Filed March 4, 1966   4 Sheets-Sheet 3
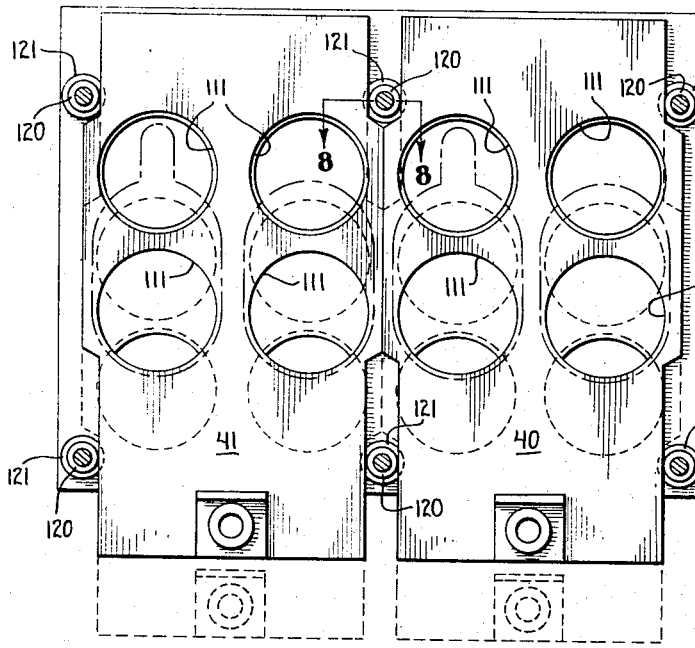
Fig. 7.
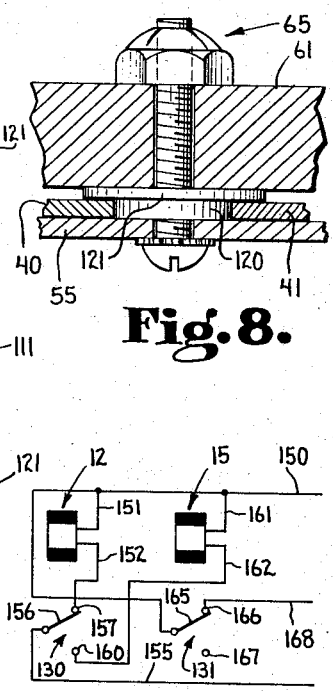
Fig. 8.
Fig. 14.
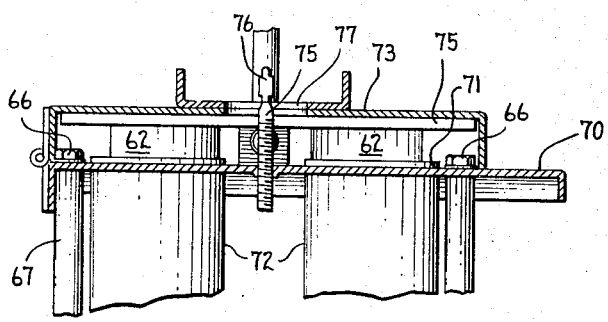
Fig. 9.
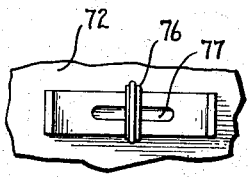
Fig. 10.
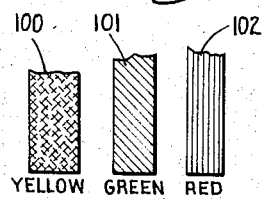
Fig. 13.
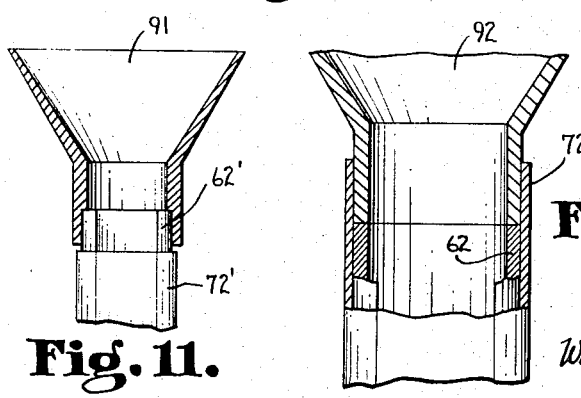
Fig. 11.
Fig. 12.
INVENTORS.
EDWARD J. TRYON and
MELVIN D. PERDUE
Woodard, Weikart, Emhardt & Naughton
Attorneys Dec. 26, 1967  E. J. TRYON ET AL  3,359,993
CHANGEMAKER Filed March 4, 1966  4 Sheets-Sheet 4

INVENTORS.
EDWARD J. TRYON and
MELVIN D. PERDUE

BY *Woodard, Weikart, Emhardt & Naughton*
Attorneys

United States Patent Office 3,359,993
Patented Dec. 26, 1967

3,359,993
CHANGEMAKER
Edward J. Tryon, Trafalgar, and Melvin D. Perdue, Indianapolis, Ind., assignors to Standard Change-Makers, Inc., Indianapolis, Ind., a corporation of Indiana
Filed Mar. 4, 1966, Ser. No. 531,969
12 Claims. (Cl. 133—2)

ABSTRACT OF THE DISCLOSURE

Apparatus for dispensing small denomination coins in return for coins and bills of larger denomination and including limit switches sensing when coin tubes are empty and transferring operation to further coin tubes. The coin tubes form a part of a magazine which, when empty of coins, can be removed from the changemaker and replaced by a full magazine. Each coin carrying tube is slotted and is surrounded by a calibrated transparent outer tube removably slidable up off of the inner coin tube. Different change amounts can be dispensed by building up a different magazine through use of chassis building blocks.

---

The present invention relates to a changer or changemaker mechanism and to certain subcombinations thereof.

Various types of changer or changemaker mechanism and apparatus are constructed and arranged to dispense coins or give change. In some cases the change is dispensed along with a product while in other cases the sole function of the mechanism is to give change. The item changed may be paper money such as a dollar bill or may be a coin such as a fifty cent piece.

One of the problems involved in the maintenance of such changer mechanism is the reloading thereof with coins. This is usually done at the mechanism location by a service man who removes the input items such as dollar bills and fifty cent pieces and refills change such as quarters and dimes. Such servicing cannot be conveniently accomplished at the machine location because it interferes with the operation of the mechanism by the customer and places the mechanism out of order for a substantial period of time. Also, such servicing exposes substantial amounts of cash to public view and thus increases the possibility of robbery or theft. Further, such servicing requires a substantial amount of service man time on location and does not allow accurate audits of the change contents on a periodic basis.

Consequently, one object of the invention is to provide changer mechanism which is easily and quickly serviced and refilled.

A further object of the invention is to provide an improved changer mechanism.

Another object of the invention is to provide changer mechanism which does not require the exposure of substantial amounts of cash to the public.

A further object of the invention is to provide changer mechanism which provides greater change capacity for a given height of coin stack and given height of mechanism.

Still other objects of the invention are to provide a changer mechanism which substantially reduces the amount of service man time on location and to provide a changer mechanism which makes periodic audits easy and convenient.

Related objects and advantages will become apparent as the description proceeds.

One embodiment of the present invention might include in a changer mechanism: a magazine including a chassis, a plurality of tubes each constituting a holder for a plurality of coins in stack relation, a slide plate member slidable in said chassis beneath at least one of said tubes for moving coins from said one tube and dispensing them, a housing, a solenoid mounted in said housing and having an armature member, a bushing mounted on one of said members, a projection secured to the other of said members and inserted in said bushing and securing said armature member to said slide plate member, and means for securing said chassis to said housing whereby said solenoid slides said slide plate member.

The full nature of the invention will be understood from the accompanying drawings and the following description and claims.

FIG. 2 is a perspective view of the lower portion of the structure or the housing illustrated in FIG. 1 showing the magazine of FIG. 1 removed therefrom.

FIG. 3 is a bottom plan view of the magazine of FIG. 1.

FIG. 4 is a vertical section taken along the line 4—4 of FIG. 3 in the direction of the arrows.

FIG. 7 is a top plan view of the lower chassis and slide plates forming a part of the magazine of FIGS. 1, 3, 4, 5 and 6.

FIG. 8 is an enlarged vertical section taken along the line 8—8 of FIG. 7 in the direction of the arrows.

FIG. 9 is an enlarged section taken along the line 9—9 of FIG. 1 in the direction of the arrows.

FIG. 10 is a top plan view of a portion of the structure illustrated in FIG. 9.

FIGS. 11 and 12 are side elevations partially in section showing alternative devices for filling the coin receiving tubes of the present mechanism.

FIG. 13 is a side elevation of a plurality of different sized coin receiving tubes and illustrating the color coding used with said tubes.

FIG. 14 is a schematic view of the electrical circuit of the illustrated embodiment of the present invention.

Figure 1:
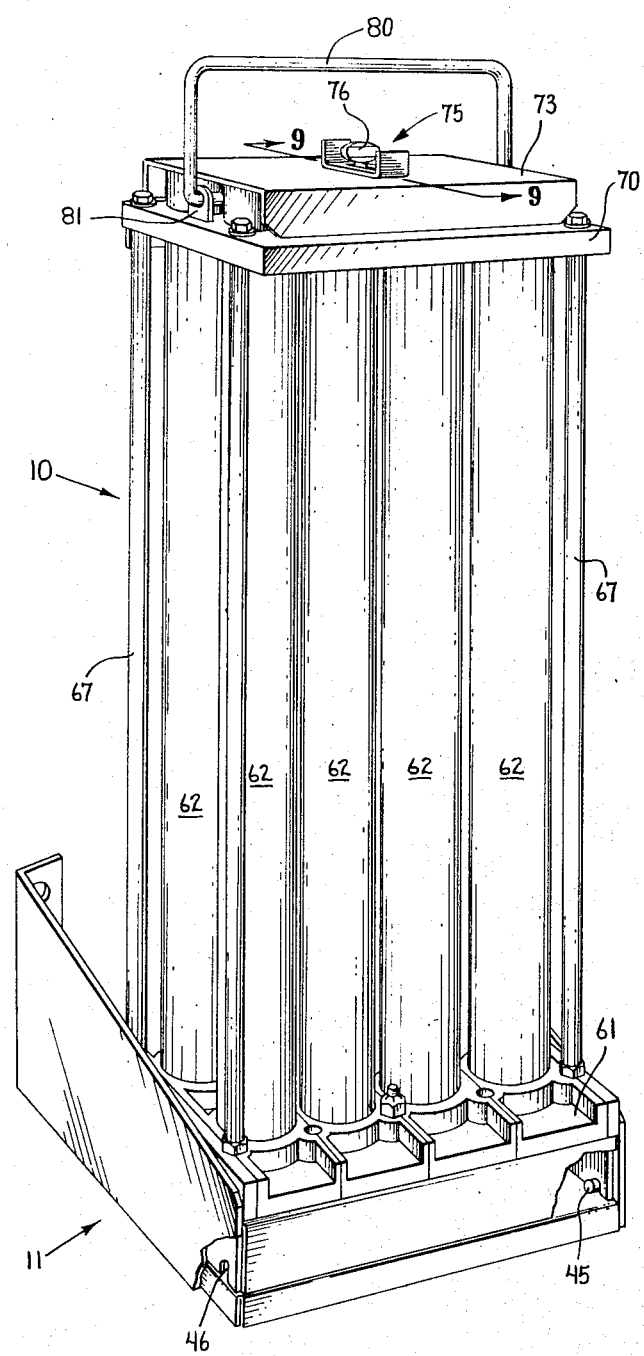
FIG. 1 is a perspective view of a changer mechanism embodying the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is illustrated a coin dispensing magazine 10 and a portion of the housing 11 in combination with which the magazine 10 is used. The housing 11 as shown in the present disclosure includes only the operating mechanism which cooperates with the magazine 10. In actual practice the housing 11 may also include a complete enclosure means for the magazine 10 including means for locking a closure to prevent unauthorized access to the magazine 10 while the apparatus is in operation dispensing change.

Referring more particularly to FIG. 2, the housing 11 includes a pair of solenoids 12 and 15 which are provided with armatures 16 and 17. Each of the armatures is provided with a limit means 20 and 21 which limits the movement of the armature into the solenoid 12 or 13 when the solenoid is energized. Secured to the armatures 16 and 17 are oppositely projecting rods 22 and 25 upon which are received tension springs 26 and 27 with the other end of said springs being secured to the upright flange 30 forming a part of the housing 11. The housing 11 also incorporates further limit members 31, which are also fixedly mounted upon the housing 11 and which limit the travel of the armatures 16 and 17 in a projected direction. The springs 26 and 27 normally yieldably retain the armatures in their projected position engaging the limits 31.

Each of the armatures 16 and 17 has mounted thereon an upwardly extending projection 32 and 35 which engages a respective one of the bushings 36 and 37 (FIG. 3) in the magazine 10 for moving the slide plates 40 and 41 to dispense coins. The slide plate 40 is representative of the slide plates 40 and 41 and is illustrated in section in FIG. 4. As shown in FIG. 4 the projection 32 extends upwardly through the bushing 36 and thus engages the bushing for moving the slide plate leftwardly or rightwardly as viewed in FIG. 4. When the slide plate 40 is moved leftwardly or rightwardly by the armature 16 of the solenoid 12, the magazine is retained in position by means of trunnion members 45 (FIGS. 1, 2 and 4) which engage respective downwardly opening recesses or saddles 46 in the opposite sides of the magazine 10.

Thus the magazine 10 can be easily mounted within the housing 11 by dropping the magazine down into the housing 11 with the recesses 46 mating with the trunnion members 45 and the projections 32 and 35 mating with the bushings 36 and 37. In order to quickly mount the magazine 10 upon the housing 11, the magazine is placed down into the housing with the recesses 46 on the trunnion members 45 and then the magazine is pivoted on the trunnion members to insert the projections 32 and 35 in the bushings 36 and 37. It will be noted from FIG. 4 that the projections 32 (and 35 also) are rounded off at the top portion thereof which is away from the trunnion members 45 in order to facilitate the mounting of the magazine on the housing.

As illustrated in FIG. 3, the magazine 10 is provided with tension springs 50 and 51. Each tension spring has one end secured to a respective one of the slide plates 40 and 41 by means of angles 52 and 53 and the other end secured to the bottom surface of the lower chassis plate 55 by means of an angle 56. The springs 50 and 51 yieldably maintain the slide plates 40 and 41 in positions corresponding to the positions of the armatures 16 and 17 illustrated in FIG. 2. Of course the armatures 16 and 17 are yieldably maintained in the positions of FIG. 2 by the springs 26 and 27 whereby no inconvenient and complicated positioning of the armatures or slide plates is necessary when the magazine is mounted in the housing.

The chassis 60 of the magazine includes not only the lower chassis plate 55 but also an upper chassis plate or member 61 which in the present embodiment is formed of plastic and which mounts eight coin receiving tubes 62. Six bolts 65 and 66 secure the lower chassis plate to the upper chassis plate. The four bolts 66 have posts 67 mounted thereon and to provide mounting for an upper frame plate 70 which is provided with a plurality of apertures 71 receiving and positioning the upper ends of the tubes 62. The tubes 62, as well as calibrated transparent tubes 72 surrounding the tubes 62, extend through the upper frame plate 70. Hingedly mounted upon the upper frame plate 70 is a cover 73 for the magazine, said cover having therein a cushion 75 which is adapted to engage the upper ends of the tubes 62 to retain the coins therein and to hold the tubes 62 in place. The cover 73 is yieldably locked down against the tubes 62 by means of a locking thumb screw 76 which has a head 76 extending through an aperture 77 in the cover 73. The magazine 10 is carried by a handle 80 pivotally mounted within angles 81 fixed to the frame plate 70.

Figure 5:
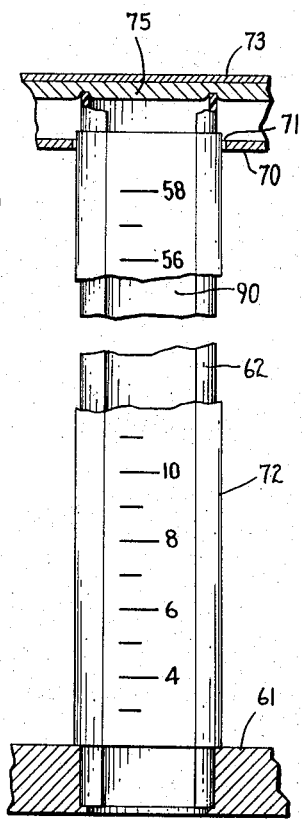
FIG. 5 is a vertical section similar to FIG. 4 but showing only a representative one of the coin receiving tubes and calibrated tubes of the present mechanism and associated structure.
Figure 6:
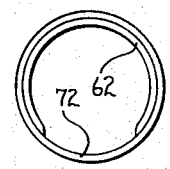
FIG. 6 is a top plan view of the coin receiving tube and calibrated tube of FIG. 5.

Referring now more particularly to FIG. 5, each of the coin receiving tubes 62 is provided with a respective transparent calibrated tube 72 which is received upon and surrounds the tube 62. In the present embodiment of the invention the various tubes 62 are intended to receive quarters. Consequently the markings 4, 6, 8 and 10 on the tube 72 of FIG. 5 are intended to indicate the dollar value of the quarters contained within the particular tube 62. Each of the inner tubes 62 is provided with a slot 90 which extends through approximately 90 degrees of the side wall of the inner tube 62 completely along the length of the tube. The calibrated transparent tube 72 is removable by sliding it upwardly off of the respective tube 62 in order to provide access to the contents of the tube 62 through the slot 90.

Referring to FIG. 11 and FIG. 12 there are illustrated two different ways in which funnels 91 and 92 can be attached or fitted to the upper end of the tubes 62, 62', 72 and 72'. Preferably the calibrated transparent tubes 72 and 72' are left in position while coins are being fed into the tubes 62 and 62' through the funnels 91 and 92 in order to prevent the coins from spilling out through the openings 90. After the tubes 62 have been filled with coins it may be noticed from observation through the transparent tube 72 that some of the coins are bent. The calibrated transparent tube 72 can then be removed from its respective tube 62 in order to provide access to the bent coins. The large width of the slot 90 permits inserting the fingers or some suitable tool into the tube 62 in order to remove the bent coin through the slot 90. Filling of the tube then can be continued by replacing the calibrated transparent tube 72 on the tube 62 and again attaching or fitting the funnel to the top of the tubes.

Because of the fact that the magazine can be completely removed from the housing 11, the magazine can be taken back to the central office by the service man for filling by persons whose sole duty can be the filling of such magazines. Obviously the assembling of a large number of magazines for filling at a central office makes much more efficient the filling of the magazines, particularly by use of the funnels illustrated in FIG. 11 and FIG. 12. One of the problems in filling such tubes as the tubes 62, 62', 72 and 72', however, is the fact that different coins must be placed in different sized tubes. In the illustrated embodiment all eight of the tubes 62 are of the same size and are intended for receiving quarters for providing change for a dollar bill. In some embodiments of the present invention, however, different sized tubes are provided as illustrated for example in FIG. 13, where three different sized tubes 100, 101 and 102 are shown. In such an arrangement, which would be identical to the present arrangement except for obvious modifications, the tubes 100, 101 and 102 which correspond to the tubes 62 and 62' are color coded to indicate to the person filling the tubes what size tubes they are. The person filling the tubes then knows what coins should be placed in those particular tubes. If desired, the funnels 91 and 92 may also be color coded to indicate the particular size of tube to which they are to be fitted and the coins to be placed therein.

Referring now more particularly to FIG. 3, it can be seen that the lower chassis plate 55 is provided with a plurality of elongated openings 110 through each of which the coins from two of the tubes 62 are dropped or dispensed. Of course the dispensed coins move out of the housing 11 through the dispensing passage 93. As shown in FIG. 7 each of the slide plates 40 and 41 is provided with four openings 111. In actual operation of the present apparatus, only one of the slide plates 40 or 41 reciprocates at a time. When that particular slide plate 40 or 41 is reciprocating it picks up two coins or quarters from two of the tubes 62 at one end of the travel of the slide plate and picks up two coins in the other two openings 111 at the other end of the travel of the slide plate.

Each time the particular slide plate moves through a movement in one direction or moves half of its reciprocation, it also deposits two quarters through its respective openings 110 in the lower chassis plate. Thus each time a respective slide plate moves through a complete reciprocation it drops four quarters through two of the openings 110 and provides change for a dollar. It can be seen that one energization and one deenergization of one of the solenoids 12 or 15 is sufficient to provide change for a dollar since the springs 26 and 27 and the springs 50 and 51 return the particular slide plate concerned through the second half of its reciprocation after the solenoid 12 or 15 has been deenergized.

FIG. 8 shows the details of one of the bolts 65 and 66 and also shows the spacing and the manner of mounting of the slide plates 40 and 41. On each of the bolts 66 there is provided in addition to the post 67 additional spacers 120 and 121. The spacers 120 and 121 taken together space apart the lower slide plate 55 and the upper chassis plate 61. The spacer 120 has a thickness which is greater than the thickness of the slide plates 40 and 41. The spacer 121 retains the slide plates 40 and 41 in a generally downward position between the upper chassis plate 61 and the lower chassis plate 55. The quarters dispensed by the present apparatus have a thickness which is greater than the slide plates 40 and 41 but which is less than the distance between the upper chassis plate 61 and the lower chassis plate 55 (in other words, less than the total thickness of the washers 120 and 121). As shown in FIG. 7, the four bolts 66 and the two bolts 65 along with washers 120 and 121 provide guide means for the slide plates 40 and 41.

Mounted within the housing 11 are a pair of microswitches 130 and 131 which have sensing arms 132 and 133. These sensing arms are intended to project upwardly through the lower chassis plate 55 and through the openings or indentations 135 and 136 to sense the coins within a one of the four tubes 62 from which a single one of the slide plates dispense. Thus when one of the tubes above the indentation 135 or 136 becomes empty, the sensing arm 132 or 133 will move into the tube and will change the position of the contacts of the microswitch.

Referring to FIG. 14 the electrical schematic of a portion of the present apparatus is illustrated. A vend or dispensing impulse is provided to the solenoid 12 through the lines 150, 151, the solenoid 12, the line 152, the microswitch 130 and the line 155. The contact 156 of the microswitch 130 normally engages the contact 157 thereof when the microswitch is depressed by reason of coins being in its particular tube 62. When the coins within the tube 62 corresponding to the microswitch 130 become completely dispensed, the contact 156 moves into engagement with the contact 160 thus breaking the circuit to the solenoid 12 and making a circuit to the solenoid 15 through the line 150, the line 161, the solenoid 15, the line 162, the contacts 160 and 156 and the line 155. Thus the next time that the circuitry is provided with energizing current for a solenoid, solenoid 12 is not energized and instead solenoid 15 is energized.

The microswitch 131 incorporates contacts 165 and 166 which are normally in engagement when the actuating arm 133 is depressed by coins in the tube above the actuating arm. When the tube above the actuating arm becomes completely empty of coins, the actuating arm moves up into the tube and thus moves the contact 165 into engagement with the contact 167 breaking the circuit between the line 150, the contact 165, the contact 166 and the line 168.

In the present apparatus the line 168 leads to the bill verifier. Such a bill verifier is commercially available and may be, for example, a One Dollar Bill Verifier, Model No. 14–001–06, manufactured by Development Associates of Goleta, Calif. When no voltage is provided through the circuit including the line 168, the bill verifier is conditioned to reject all bills placed into the apparatus and thus prevents any bills being accepted by the mechanism. Such operation is desired because the mechanism is completely out of coins. Of course the transferring operation accomplished by the microswitch 130 causes the coins to be dispensed by means of the solenoid 12 until such time as the coins are completely dispensed from one side or four of the tubes 62 and then the coins are dispensed from the other side of the magazine.

It will be evident from the above description that the present invention provides a changer mechanism which is easily and quickly serviced. Thus the service man can take a filled magazine such as the magazine illustrated in FIG. 1 to the location of the changer and can insert the filled magazine to replace an empty magazine. He does not need to fill magazines but instead can accumulate empty magazines so as to return all of them to a central office where they are easily and efficiently filled. It will also be evident that the present invention provides a changer mechanism which does not require the exposure of substantial amounts of cash to the public. This is true because of the fact that the magazines can be quickly changed and because of the fact that the service man does not need to expose coins from a package in order to insert them into the coin stacks or tubes of the changer apparatus.

It will be further evident that the present invention provides a changer mechanism which operates for a greater length of time for given height of coin stack. This is true because of the fact that the coin changer dispenses from only one group of tubes and then, by reason of the microswitch 130, switches to another group of coin tubes in order to provide change. Of course the provision of the microswitch 131 insures that when the machine is completely empty of coins, it will not accept further input of dollar bills or, in other embodiments, input of coins.

Still another important feature of the invention is illustrated in FIGS. 4, 15, 16 and 17 of the drawings. As mentioned above the upper chassis plate or member 61 is formed of plastic. The coin receiving tubes 62 which are mounted on the chassis plate are also made of the same plastic. The particular embodiment illustrated in FIGS. 1–14 incorporates eight identical tubes 62 which, as mentioned, receive (and dispense) quarters so that the mechanism of FIGS. 1–10, 12 and 14 is designed to dispense four quarters for a dollar.

Figure 15:
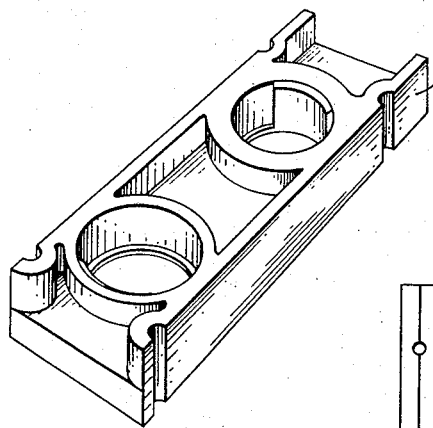
FIG. 15 is a perspective view of a plastic block used in building up the upper chassis plate or block forming a part of the coin magazine.
Figure 16:
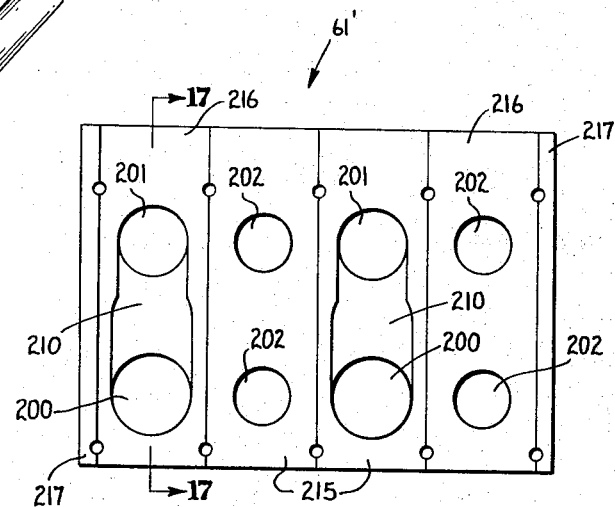
FIG. 16 is a bottom plan view of the completed upper chassis plate or block of an alternative embodiment of the invention.
Figure 17:
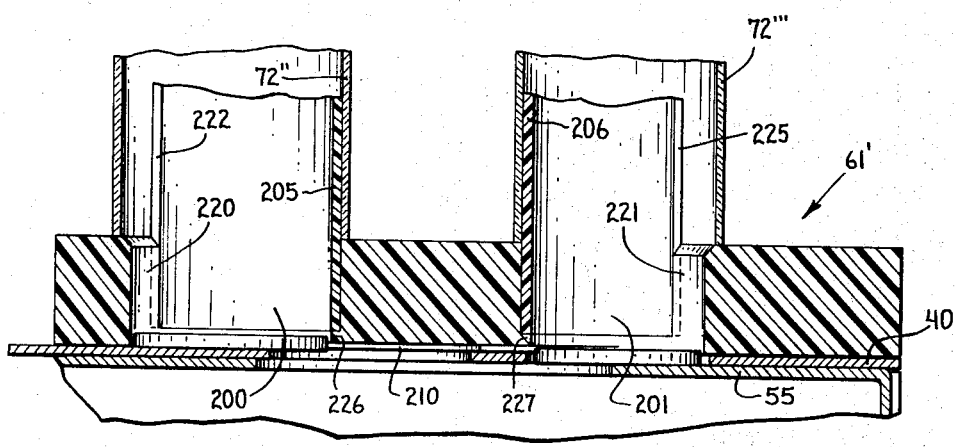
FIG. 17 is an enlarged vertical section taken along the line 17—17 of FIG. 16 in the direction of the arrows.

The arrangement of FIGS. 15, 16 and 17 is intended to dispense change for fifty cents, that is, one quarter, two dimes and a nickel. Referring to FIG. 16, there is illustrated an upper chassis plate 61' which has formed therein openings 200, 201 and 202 which are suitably sized to pass quarters, nickels and dimes respectively. Of course as shown in FIG. 17, the openings 200 and 201 mount suitable tubes 205 and 206, respectively, which function identically to the above described tubes 62. The tube 205 is identical to the tubes 62. The tube 206 is also identical thereto except for size as are similar such tubes (not shown) provided for the openings 202.

The advantages of the construction of FIGS. 15, 16 and 17 is that all of the sets of upper chassis blocks and associated tubes are interchangeable with one another. In other words, the block shown in FIGS. 16 and 17 can be assembled into the mechanism of FIGS. 1–10, 12 and 14 by removing the block 61 and associated tubes 62 and replacing them with the tube-block assembly of FIG. 17. This reassembly is partially shown in FIG. 17 wherein the block 61' is shown assembled with the coin slide plate 40 and the lower chassis plate 55. Further such tube-block assemblies can be provided for dispensing different amounts of change and they all are usable with the remaining structure shown in FIGS. 1–10, 12 and 14.

This interchangeability is made possible by the use of the grooves or routed out portions 21 of FIGS. 16 and 17. The grooves 210 provide additional space sufficient to pass the additional thickness of the quarters and nickels as compared to the thickness of the dimes. It can be seen that the dime openings 202 do not have the groove 210 provided for the nickel and quarter openings. By the use of the grooves 210 and deeper such grooves for fifty cent pieces, there is no necessity to vary the spacing of the upper and lower chassis plates or blocks or to vary the thickness of the coin slide plate 40 or the thickness of the washers 120 and 121. Instead all of these parts can carry out their purpose as above described in connection with FIGS. 1–14. This fact makes manufacture much simpler and less expensive and makes replacement of parts and conversion from one amount of change to another much easier and simpler. Of course the grooves 210 in each case extend from the opening 201 or 200 to a position over the opening 110.

The block 61' is actually a block assembly because it is formed from a plurality of blocks 215, 216 and 217, a representative one of which, the block 216, is shown in FIG. 15. The blocks 215, 216 and 217 are all placed in a fixture and are glued together or made integral by a glue or solvent previously placed on the contacting surfaces thereof. In one example of the invention the plastic of the blocks 215, 216 and 217 was a cycolac while the glue or solvent was carbon tetrachloride.

The tubes 205 and 206 are also secured in similar fashion to the resulting block assembly 61'. As mentioned, the tubes 205 and 206 are identical to the tubes 62 except for size. It will be noted that the block 61' (as well as the block 61) is provided with radially inwardly extending projections 220 and 221 which are tapered downwardly and inwardly at their upper surfaces and which guide the coins to pass completely through the openings 200 and 201 without hanging upon the projections 220 and 221. The projections 220 and 221 extend through 90° and therefore fill the portions of the slots 222 and 225 at the lower ends of the tube 205 and 206.

The projections 220 and 221 are flush at their lower portions with the ledges 226 and 227 which extend completely around the lower edge of the openings 200 and 201 in the block 61'. The ledges 226 and 227 receive the tubes 205 and 206 and are flush with the inside surfaces of the tubes 205 and 206. Also the projections 220 and 221 are flush with the insides of the tubes 205 and 206 so that completely continuous non-projecting surfaces are provided inside the tubes and adjacent the tubes all the way down to the coin slide plate 40. Consequently, there are no projections upon which the coins will catch or hang up interfering with operation of the device. The tube 72" is identical to the tube 72. The tube 72''' is identical to the tube 72" except as to size. It can be appreciated that the upper frame plate 70 with its apertures 71 will more tightly receive tubes of the size of tubes 72" than it will receive tubes of the size of tubes 72''' even though all of the tubes are relatively loosely received in the apertures. This does not interfere with the operation of the device, however, since the function of the frame plate is merely to generally position the quiet plastic tubes rather than to precisely fix them in position. The looseness of this fitting also permits easy and quick assembly and disassembly of the tubes from the upper frame plate. Also, the looseness of this fitting permits the calibrated transparent tubes 72, 72', 72" and 72''' to be easily slipped upwardly off of the tubes 205, 206, 62 and 62'.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a money changer mechanism, a magazine including a chassis and means for holding a plurality of coins in stack relation, a slide plate member slidable in said chassis beneath said means for moving coins from said means and dispensing them, a housing, a solenoid mounted in said housing and having an armature member, said armature member being adjacent said slide plate member and engageable with said slide plate member for movement thereof by said armature, and means for securing said chassis to said housing whereby said solenoid slides said slide plate member, said means for securing said chassis to said housing comprising a projecting element and saddle which are mounted on said chassis and housing with said projecting element received in said saddle, said projecting element being detachable from said saddle and said armature and slide plate movable apart by merely lifting said chassis away from said housing.

2. The money changer mechanism of claim 1 additionally comprising a further slide plate member slidable in said chassis beneath another of said tubes for moving coins from said another tube and dispensing them, a further solenoid mounted in said housing and having a further armature member, a further bushing mounted on one of said further members, a further projection secured to the other of said further members and inserted in said further bushing and securing said further armature member to said further slide plate member, a pair of microswitches mounted in said housing, one of said microswitches having its sensing element at the bottom of said one tube to sense when said another tube is empty of coins and the other microswitch having its sensing element at the bottom of said another tube to sense when said another tube is empty of coins, said one microswitch being arranged to stop further operation of said first mentioned solenoid and to condition said further solenoid for operation, means for blocking input of items to be changed, said last named means being operated by said further microswitch when said further microswitch senses that said another tube is empty.

3. The money changer mechanism of claim 1 additionally comprising a further slide plate member slidable in said chassis beneath another of said tubes for moving coins from said another tube and dispensing them, a further solenoid mounted in said housing and having a further armature member, a further bushing mounted on one of said further members, a further projection secured to the other of said further members and inserted in said further brushing and without further attachment securing said further armature member to said further slide plate member, a microswitch mounted in said housing, said microswitch having its sensing element at the bottom of said one tube, said microswitch being arranged to stop further operation of said first mentioned solenoid and to condition said further solenoid for operation.

4. The money changer mechanism of claim 1 additionally comprising a microswitch mounted in said housing, said microswitch having its sensing element at the bottom of said one tube, means yieldably urging said sensing element upwardly into the bottom of said tube so that said sensing element changes position and senses when said tube is empty, and means for blocking input of items to be changed, said last named means being operated by said microswitch when said microswitch senses that said tube is empty.

5. The money changer mechanism of claim 1 additionally comprising means limiting the travel of said armature between a projected position and a retracted position, means limiting the travel of said slide plate between a position corresponding to said projected position and a position corresponding to said retracted position, first spring means secured between said armature and said housing and yieldably retaining said armature in one of its two positions, and second spring means secured between said slide plate and said chassis and yieldably retaining said slide plate in its position which corresponds to said one position of said armature.

6. In a money changer mechanism, a magazine including a chassis, a plurality of tubes each constituting a holder for a plurality of coins in stack relation, a slide plate member slidable in said chassis beneath at least one of said tubes for moving coins from said one tube and dispensing them, a housing, a solenoid mounted in said housing and having an armature member, a bushing mounted on one of said members, a projection secured to the other of said members and inserted in said bushing and securing said armature member to said slide plate member, and means for securing said chassis to said housing whereby said solenoid slides said slide plate member, said means for securing said chassis to said housing comprising a pair of inwardly projecting trunnion elements fixed to said housing, said chassis having a pair of downwardly opening recesses which receive said trunnion elements, said projection being secured to said armature and said bushing to said slide plate, said magazine being removable upwardly away from said housing to disconnect said chassis from said trunnion elements and said projection from said bushing, said magazine being pivotal on said trunnion elements for engaging said projection in said bushing.

7. The money changer mechanism of claim 6 additionally comprising an upper frame plate, rods securing said plate to said chassis, said tubes extending upwardly through said frame plate and terminating adjacent thereto, a cover for said magazine hingedly connected to said frame plate and swingable to closed position over said tubes closing off the upper ends of said tubes, and means for locking said cover down against said tubes.

8. The money changer mechanism of claim 7 wherein said one tube has a slot in the side wall thereof through which coins in said tube are visible, and a calibrated transparent tube slidably received over said one tube and indicating the number of coins in said one tube.

9. The money changer mechanism of claim 7 wherein each of said tubes has a slot in the side wall thereof through which coins in the respective tube are visible, and calibrated transparent tubes slidably received over said first mentioned tubes and indicating the number of coins in said first mentioned tubes.

10. The money changer mechanism of claim 9 wherein each of said first mentioned tubes are color coded according to the size of the coin to be stacked in the tubes of said first mentioned tube.

11. In a money changer mechanism, a first tube constituting a holder for a plurality of coins in stack relation, said tube having a slot in the side wall thereof through which the coins in said tube are visible, a calibrated transparent tube slidably received over said first tube and indicating the number of coins in said first tube, said slot being sufficiently wide to permit manipulation through the slot to remove bent coins from the tube through the slot, said calibrated tube being slidable over and off of the first tube to remove the calibrated tube from the first tube to permit such manipulation, a chassis plate having an opening therethrough, a ledge at the bottom of said opening, said first tube being received in said opening with said tube in abutment with said ledge, and the inside of said tube flush with said ledge, said plate having a projection which extends radially inwardly of said opening and is tapered downwardly and inwardly at the top of said projection to guide coins in said tube, said projection also being flush with the inside of said tube.

12. In a money changer mechanism, a magazine including a chassis, a first tube constituting a holder for a plurality of coins in stack relation, said chassis including an upper chassis plate and a lower chassis plate fixedly secured thereto, a slide plate member being slidable between said upper chassis plate and said lower chassis plate, said upper chassis plate including a pair of blocks secured together, one of said blocks having an opening therein corresponding to said tube and in registry therewith, said slide plate having a coin receiving opening therein, said lower chassis plate having an opening therein offset from said one block opening and through which coins may pass, a further tube constituting a holder for a plurality of coins in stack relation, the other block of said pair of blocks having said further tube mounted thereon and having a further opening therein corresponding to said further tube and in registry therewith, said other block opening and tube being proportioned for a larger sized coin than said one block opening and first tube, said other block having an indentation on the surface thereof toward said slide plate, said indentation overlapping said further upper chassis plate opening and said lower chassis plate opening and providing clearance between said further upper chassis plate and said lower chassis plate for movement of said larger sized coins from said further tube to said lower chassis plate opening, both of said blocks being spaced an equal distance from said lower chassis plate except for said indentation.

References Cited

UNITED STATES PATENTS

| 2,567,900 | 9/1951 | Winkler. | |
| 2,686,525 | 8/1954 | Jaskowiak | 133—2 |
| 2,802,474 | 8/1957 | Du Grenier et al. | 133—2 |
| 2,825,346 | 3/1958 | Gabrielsen | 133—2 |
| 3,085,378 | 4/1963 | Howard. | |
| 3,125,103 | 3/1964 | Davidson et al. | 133—2 |
| 3,125,104 | 3/1964 | Tryon | 133—5 |
| 3,140,765 | 7/1964 | Sundblad et al. | 133—2 |

WALTER SOBIN, *Primary Examiner.*